United States Patent
Noda et al.

(10) Patent No.: US 6,604,576 B2
(45) Date of Patent: *Aug. 12, 2003

(54) AUTOMOTIVE AIR CONDITIONING SYSTEM

(75) Inventors: Yoshitoshi Noda, Tochigi (JP); Hiroyuki Yamaguchi, Tochigi (JP); Tadayoshi Tajima, Tochigi (JP); Hiroki Yoshioka, Tochigi (JP); Toshio Ohashi, Tochigi (JP); Kenichi Abe, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/968,040

(22) Filed: Nov. 12, 1997

(65) Prior Publication Data

US 2002/0005268 A1 Jan. 17, 2002

(30) Foreign Application Priority Data

Nov. 15, 1996 (JP) .............................. 8-304936
Jan. 24, 1997 (JP) .............................. 9-011417

(51) Int. Cl.$^7$ ............................. F25B 29/00; B60H 1/32
(52) U.S. Cl. ........................... 165/202; 165/42; 165/43; 165/240; 165/241; 165/203; 237/2 B; 237/12.3 B; 237/12.3 A; 62/196.4; 62/244; 62/238.6
(58) Field of Search ........................... 165/42, 43, 202, 165/203, 240, 241; 237/12.3 A, 12.3 B, 2 B; 454/156; 62/244, 323.1, 238.6, 196.4, 324.6, 324.1, 173

(56) References Cited

U.S. PATENT DOCUMENTS

| | | |
|---|---|---|
| 3,779,031 A | 12/1973 | Akiyama et al. |
| 3,841,395 A | 10/1974 | Steinman |
| 3,926,000 A | 12/1975 | Scofield |

(List continued on next page.)

FOREIGN PATENT DOCUMENTS

GB    2 101 286    1/1983

(List continued on next page.)

OTHER PUBLICATIONS

Patent Abstracts of Japan, Pub. No. 59143716 published Aug. 17, 1984, inventor Kenichi Fujiwara (1984).

Patent Abstracts of Japan, Pub. No. 62152915 published Jul. 7, 1987, inventor Shugiyama Takeshi (1987).

*Primary Examiner*—John K. Ford
(74) *Attorney, Agent, or Firm*—Foley & Lardner

(57) ABSTRACT

An air conditioning system for a vehicle has a first cycle including a compressor, a first condenser, a second condenser, a liquid tank, an expansion valve and an evaporator which are connected through pipes to form a first refrigerant circulation circuit through which a refrigerant flows from an outlet of the compressor to an inlet of the compressor while changing the phase. The first cycle causes the evaporator to act as a cooler when operated. The system further has a second cycle including the compressor, the second condenser, the liquid tank, the evaporator and the evaporator which are connected through pipes to form a second refrigerant circulation circuit through which the refrigerant flows from the outlet of the compressor to the inlet of the compressor while changing the phase. The second cycle causes the condenser to act as a heater and the evaporator to act as a cooler when operated. The first and second cycles are switched by switch means. The system further has an air duct case having an air flow passage in which the second condenser and the evaporator are installed. The air flow passage is connected at its downstream part to a passenger room of the vehicle. The air conditioning system further comprises heater means for heating a returning refrigerant which, under operation of the second cycle, flows in the pipe extending from an outlet of the evaporator to the inlet of the compressor.

3 Claims, 15 Drawing Sheets

U.S. PATENT DOCUMENTS

| | | | |
|---|---|---|---|
| 4,482,092 A | | 11/1984 | Biber et al. |
| 4,688,390 A | | 8/1987 | Sawyer |
| 4,865,124 A | * | 9/1989 | Dempsey .................... 165/163 |
| 4,903,495 A | | 2/1990 | Howland et al. |
| 4,949,553 A | | 8/1990 | Suzuki |
| 5,020,320 A | | 6/1991 | Talbert et al. |
| 5,157,933 A | | 10/1992 | Brendel |
| 5,174,365 A | | 12/1992 | Noguchi et al. |
| 5,275,009 A | | 1/1994 | Kobayashi et al. |
| 5,291,941 A | | 3/1994 | Enomoto et al. |
| 5,299,631 A | | 4/1994 | Dauvergne |
| 5,341,652 A | | 8/1994 | Tajiri et al. |
| 5,355,689 A | | 10/1994 | Hara et al. |
| 5,386,704 A | | 2/1995 | Benedict |
| 5,396,776 A | | 3/1995 | Kim |
| 5,419,149 A | | 5/1995 | Hara et al. |
| 5,473,906 A | | 12/1995 | Hara et al. |
| 5,477,700 A | | 12/1995 | Iio |
| 5,501,267 A | | 3/1996 | Iritani et al. |
| 5,505,251 A | | 4/1996 | Sarbach |
| 5,528,900 A | | 6/1996 | Prasad |
| 5,531,264 A | | 7/1996 | Eike et al. |
| 5,537,831 A | | 7/1996 | Isaji et al. |
| 5,549,153 A | | 8/1996 | Baruschke et al. |
| 5,598,887 A | | 2/1997 | Ikeda et al. |
| 5,634,348 A | | 6/1997 | Ikeda et al. |
| 5,641,016 A | | 6/1997 | Isaji et al. |
| 5,651,258 A | | 7/1997 | Harris |
| 5,660,051 A | | 8/1997 | Sakakibara et al. |
| 5,706,664 A | | 1/1998 | Hara |
| 5,706,667 A | | 1/1998 | Iritani et al. |
| 5,769,316 A | | 6/1998 | Ikeda et al. |
| 5,819,551 A | | 10/1998 | Fukumoto et al. |
| 5,878,810 A | | 3/1999 | Saito et al. |
| 5,899,086 A | * | 5/1999 | Noda et al. .................... 165/42 |
| 5,910,157 A | * | 6/1999 | Noda .......................... 165/43 |
| 5,975,191 A | * | 11/1999 | Ohashi et al. ................. 165/43 |
| 6,105,666 A | * | 8/2000 | Tajima et al. ............... 62/196.4 |
| 6,125,643 A | * | 10/2000 | Noda et al. ................. 62/196.4 |
| 6,422,308 B1 | * | 7/2002 | Okawara et al. ............ 165/202 |

FOREIGN PATENT DOCUMENTS

| | | | | |
|---|---|---|---|---|
| JP | 54-137841 | | 10/1979 | |
| JP | 0031507 | * | 2/1987 | ............ 237/12.3 A |
| JP | 1-106722 | * | 1/1989 | ................. 454/156 |
| JP | 1-196456 | | 8/1989 | |
| JP | 2-500677 | | 3/1990 | |
| JP | 5-77636 | | 3/1993 | |
| JP | 5-157376 | | 6/1993 | |
| JP | 5-201243 | | 8/1993 | |
| JP | 6-159857 | | 7/1994 | |
| JP | 6-34234 | | 8/1994 | |
| JP | 6-255348 | | 9/1994 | |
| JP | 7-101227 | | 4/1995 | |
| JP | 4-132728 | | 5/1995 | |
| JP | 8-295117 | | 11/1996 | |
| JP | 9-109669 | | 4/1997 | |

\* cited by examiner

AUTOMOTIVE AIR CONDITIONING SYSTEM

BACKGROUND OF THE INVENTION

1. Field of the Invention

The present invention relates in general to air conditioning systems of a motor vehicle, and more particularly to automotive air conditioning systems of a double function type which has two function cycles, one being a cycle for cooling air by practically using the system as a closed refrigeration system and the other being a cycle for heating air while dehumidifying the same by practically using the system as a heat pump system.

2. Description of the Prior Art

Hitherto, various types of air conditioning systems have been proposed and put into practical use particularly in the field of motor vehicles. Some are of the above-mentioned double function type.

In long body passenger cars, such as one-box type vehicle or the like, there have been also used a so-called duel air conditioning system which comprises a first air conditioning unit for conditioning air in a relatively front part of a passenger room and a second air conditioning unit for conditioning air in a relatively rear part of the passenger room.

Nowadays, for obtaining advantages of the double function type, some of the dual air conditioning systems employ the principal of the double function type. That is, for example, the first air conditioning unit comprises an evaporator constituting part of an air conditioning system of double function type and a heater core fed with engine cooling water, and the second air conditioning unit comprises another evaporator connected to the air conditioning system and a condenser connected in series with the evaporator to serve as a heater.

However, due to inherent construction, the air conditioning systems of the above-mentioned dual type have failed to give users satisfaction. That is, the second air conditioning unit of the systems has failed to provide the rear part of the passenger room with a satisfactorily warmed air particularly in cold seasons.

SUMMARY OF THE INVENTION

It is therefore an object of the present invention to provide an automotive air conditioning system of double function type, which is free of the above-mentioned drawback.

It is another object of the present invention to provide an improved automotive dual air conditioning system which incorporates thereinto the principle of the double function type.

It is still another object of the present invention to provide an improved air conditioning system of double function type for an electric vehicle.

According to a first aspect of the present invention, there is provided an air conditioning system for a vehicle, which comprises a first cycle including a compressor, a first condenser, a second condenser, a liquid tank, an expansion valve and an evaporator which are connected through pipes to form a first refrigerant circulation circuit through which a refrigerant flows from an outlet of the compressor to an inlet of the compressor while changing the phase, the first cycle causing the evaporator to act as a cooler when operated; a second cycle including the compressor, the second condenser, the liquid tank, the evaporator and the evaporator which are connected through pipes to form a second refrigerant circulation circuit through which the refrigerant flows from the outlet of the compressor to the inlet of the compressor while changing the phase, the second cycle causing the condenser to act as a heater and the evaporator to act as a cooler when operated; switch means for switching the first and second cycles; an air duct case having an air flow passage in which the second condenser and the evaporator are installed, the air flow passage being connected at its downstream part to a passenger room of the vehicle; and heater means for heating a returning refrigerant which, under operation of the second cycle, flows in the pipe extending from an outlet of the evaporator to the inlet of the compressor.

According to a second aspect of the present invention, there is provided a dual air conditioning system for a motor vehicle powered by an internal combustion engine. The dual air conditioning system comprises a first system including a first cycle, a second cycle and first switch means for switching the first and second cycles, the first cycle including a compressor driven by the engine, a first condenser, a first liquid tank, a first expansion valve and a first heat exchanger which are connected through pipes to form a first refrigeration circulation circuit through which a refrigerant flows from an outlet of the compressor to an inlet of the compressor while changing the phase, the second cycle including the compressor, the liquid tank, a second condenser, a second liquid tank, a second expansion valve and a second heat exchanger which are connected through pipes to form a second refrigeration circulation circuit through which the refrigerant flows from the outlet of the compressor to the inlet of the compressor while changing the phase, the first system causing the first and second heat exchangers as coolers when operated; a second system including a third cycle which includes the same parts as those of the first cycle except the first condenser, a fourth cycle which includes the same parts as those of the second cycle except the first condenser and a second switch means for switching the third and fourth cycles, the second system causing the first and second heat exchangers as coolers and the second condenser as a heater; a heater core to which a warmed water is led from a water jacket of the internal combustion engine; an air duct case having a first air flow passage in which the heater core and the first heat exchanger are installed, and a second air flow passage in which the second condenser and the second heat exchanger are installed, each of the first and second flow passages being connected to at downstream part to a passenger room of the vehicle; and heater means for heating a returning refrigerant which, under operation of the second system, is about to enter the inlet of said compressor.

According to a third aspect of the present invention, there is provided a dual air conditioning system for a motor vehicle powered by an internal combustion engine. The system comprises a first cycle including a compressor driven by the engine, a first condenser, a first liquid tank, a first expansion valve and a first heat exchanger which are connected through pipes to form a first refrigerant circulation circuit through which a refrigerant flows from an outlet of the compressor to an inlet of the compressor, the first cycle causing the first heat exchanger to serve as a cooler when operated; a second cycle including the compressor, a second condenser, a second liquid tank and a second expansion valve which are connected through pipes to form a second refrigerant circulation circuit through which the refrigerant flows from the outlet of the compressor to the inlet of the compressor, the second cycle causing the second condenser to serve as a heater when operated; switch means for switching the first and second cycles; a heater core to which a warmed water is led form a water jacket of the internal combustion engine; an air duct having a first air flow passage in which the heater core and the first heat exchanger are installed, and a second air flow passage in which the second condenser is installed, each of the first and second air flow passages being connected at a downstream part thereof to a passenger room of the vehicle; and heater means for heating a returning refrigerant which, under operation of the second cycle, is about to enter the inlet of the compressor.

According to a fourth aspect of the present invention, there is provided an air conditioning system for an electric motor vehicle. The system comprises a first cycle including a compressor driven by an electric motor, a first condenser, a second condenser, a liquid tank, an expansion valve and an evaporator which are connected through pipes to form a first refrigerant circulation circuit through which a refrigerant flows from an outlet of the compressor to an inlet of the compressor while changing the phase, the first cycle causing the evaporator to serve as a cooler when operated; a second cycle including the compressor, the second heat exchanger, the liquid tank, the expansion valve and the evaporator which are connected through pipes to form a second refrigerant circulation circuit through which the refrigerant flows from the outlet of the compressor to the inlet of the compressor while changing the phase, the second cycle causing the condenser to serve as a heater and the evaporator as a cooler when operated; switch means for switching the first and second cycles; an air duct case having an air flow passage in which the second condenser and the evaporator are installed, the air flow passage being connected at its downstream part to a passenger room of the electric vehicle; and heater means for heating a returning refrigerant which, under operation of the second cycle, flows in the pipe extending from an outlet of the evaporator to the inlet of the compressor.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
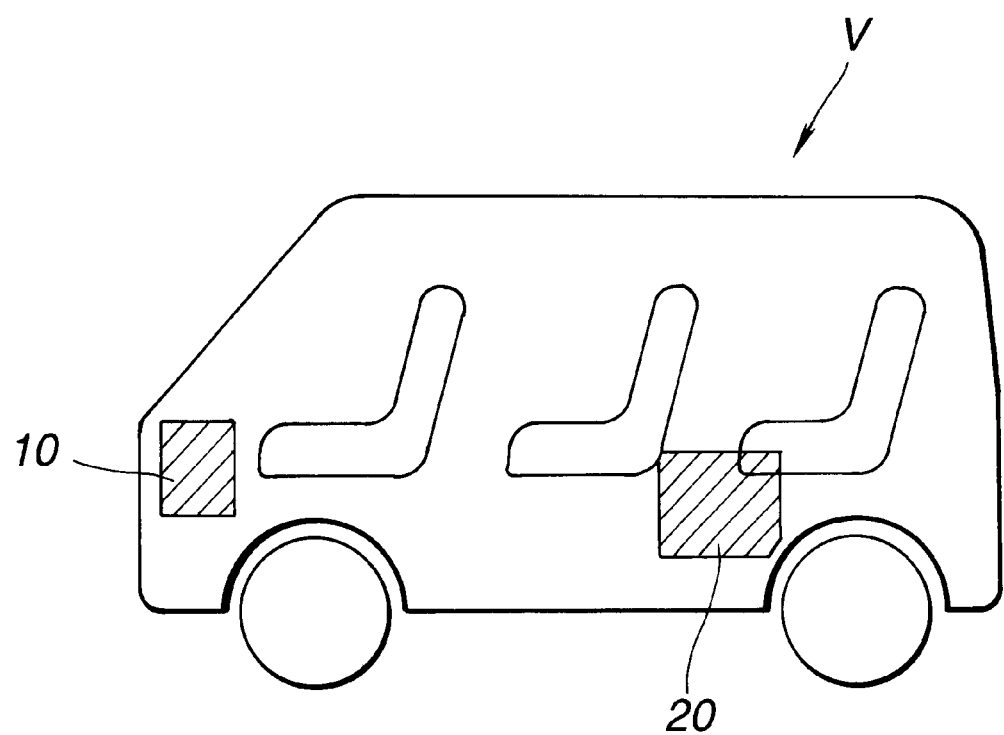
FIG. 1 is a schematic view of a one-box car to which a dual air conditioning system of the present invention is practically applied.
Figure 2:
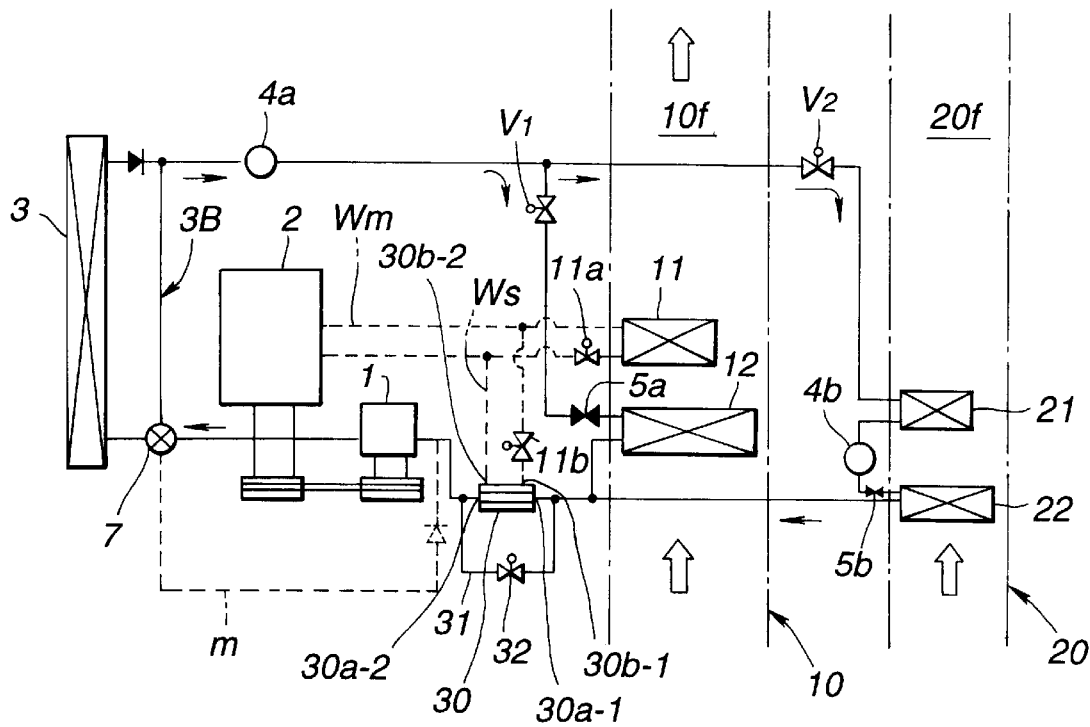
FIG. 2 is a schematically illustrated circuit of an automotive dual air conditioning system which is a first embodiment of the present invention.
Figure 3:
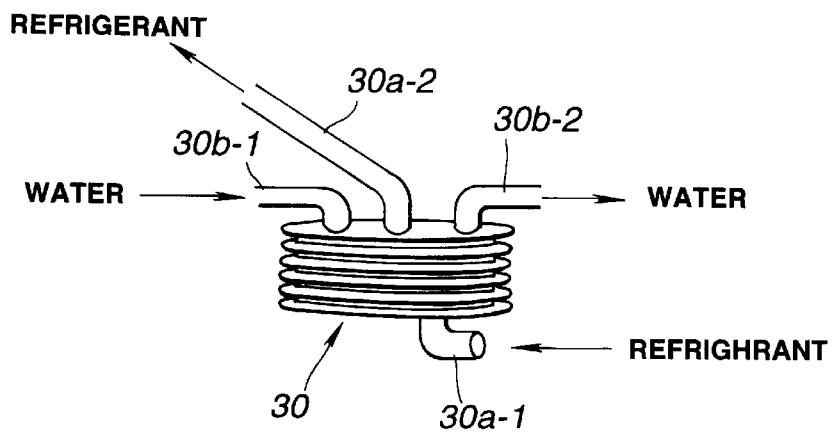
FIG. 3 is a perspective view of an extra heat exchanger employed in the system of the first embodiment.

Referring to FIGS. 1 to 3, there is shown an automotive dual air conditioning system of a first embodiment of the present invention, which is generally designated by numeral 100A.

As is seen from FIG. 1, the dual air conditioning system 100A generally comprises a first air conditioning unit 10 mounted on a relatively front portion of a vehicle "V", a second air conditioning unit 20 mounted on a relatively rear portion of the vehicle "V" and interconnecting means which operatively connects is the first and second systems 10 and 20 in such a manner as will be described hereinafter. As is understood from the drawing, the first and second air conditioning units 10 and 20 are arranged and constructed to condition air blown into relatively front and rear portions of a passenger room, respectively. That is, the first unit 10 selectively takes outside air (viz., air outside the vehicle) and/or inside air (viz., air in the passenger room) and conditions the air before discharging the same to the front portion of the passenger room, while, the second unit 20 takes inside air and conditions the same before discharging the same to the rear portion of the passenger room.

The automotive dual air conditioning system 100A is schematically illustrated in FIG. 2.

As is understood from this drawing, the first air conditioning unit 10 comprises an air intake housing having an air flow passage 10f through which air is forced to flow in a direction indicated by arrows. Although not shown in the drawing, an intake door and an electric blower are installed in an upstream portion of the air flow passage 10f. A first heat exchanger 12 and a heater core 11 are installed in the air flow passage 10f in the illustrated manner. Although not shown in the drawing, the air flow passage 10f has at its downstream end air blow openings exposed to the front part of the passenger room. Although not shown, a known air mix door is arranged at a position just upstream of the heater core 11 to control the ratio in quantity between hot air and cooled air fed to an air mix chamber from which the temperature controlled air is led to the passenger room. Usually, the air mix door can have a position to fully close the air passage for the heater core 11.

Between the heater core 11 and a water jacket of an engine 2, there is arranged a main hot water flow circuit "Wm" having an Open/Close valve 11a installed therein. That is, when the valve 11a is open, the warmed engine cooling water in the engine water jacket is fed to the heater core 11.

The second air conditioning unit 20 comprises an air intake housing having an air flow passage 20f through which air is forced to flow in a direction indicated by an arrow. Although not shown in the drawing, an electric blow is employed for producing the air flow. A second heat exchanger 22 and a second condenser 21 are installed in the air flow passage 20f in the illustrated manner. Although not shown in the drawing, the air flow passage 20f has at its downstream end air block openings exposed to the rear part of the passenger room. A known air mix door (not shown) is arranged at a position just upstream of the second condenser 21 to control the ratio in quantity between hot air and cooled air fed to an air mix chamber from which the temperature controlled air is led to the passenger room. Usually, the air mix door can have a position to fully close the air passage for the second condenser 21.

A first closed refrigeration cycle is provided, which comprises a compressor 1, a first condenser 3, a liquid tank 4a, a first Open/Close valve V1, a first expansion valve 5a and the first heat exchanger 12. The compressor 1 is driven by the engine 2.

A second closed refrigeration cycle is further provided, which comprises, in addition to the above-mentioned compressor 1, the first condenser 3 and the liquid tank 4a, a second Open/Close valve V2, the second condenser 21, a liquid tank 4b, a second expansion valve 5b, the second heat exchanger 22 and an extra heat exchanger 30 heater means.

That is, an outlet line from the liquid tank 4a is forked into two branches to which the first and second Open/Close valves V1 and V2 are connected respectively, as shown. An outlet line from the first heat exchanger 12 and an outlet line from the second heat exchanger 22 heat exchanging means are joined before being connected to an inlet line of the extra heat exchanger 30.

In order to achieve heating operation as well as cooling operation, there is arranged a bypass circuit 3B which bypasses the first condenser 3. A two-way valve 7 switch means is provided for switching the first condenser 3 and the bypass circuit 3B. That is, under the heating operation, compressed refrigerant from the compressor 1 is led to the bypass circuit 3B, while, under the cooling operation, the refrigerant is led to the first condenser 3.

Switching between the above-mentioned first and second closed refrigeration cycles is carried out by operating the first and second Open/Close valves V1 and V2.

If desired, a four-way valve may be used in place of the two-way valve 7. In this case, a return circuit "m" is further provided as is illustrated by a broken line. That is, upon starting of the heating operation, the return circuit "m" functions to return a marked amount of refrigerant kept in the first condenser 3 to an inlet of the compressor 1.

It is to be noted that the extra heat exchanger 30 is placed outside of the air flow passages 10f and 20f of the first and second air conditioning units 10 and 20. The extra heat exchanger 30 is shown in detail in FIG. 2, which comprises a refrigerant passage first passage with inlet and outlet lines 30a-1 and 30a-2 and a water passage second passage with inlet and outlet lines 30b-1 and 30b-2. Although not shown in the drawing, the refrigerant passage is surrounded by the water passage to achieve an effective heat exchange between a refrigerant in the refrigerant passage and water in the water passage. As shown, the two passages are defined in a housing having a plurality of heat radiation fins (no numeral).

Referring back to FIG. 2, the refrigerant inlet and outlet lines 30a-1 and 30a-2 of the extra heat exchanger 30 are connected to the outlet line of the first heat exchanger 12 (and thus the outlet line of the second heat exchanger 22) and the inlet of the compressor 1, respectively. The water inlet and outlet lines 30b-1 and 30b-2 of the extra heat exchanger 30 are connected through a sub hot water flow circuit "Ws" to going and coming lines of the above-mentioned main hot water flow circuit "Wm", respectively. An Open/Close valve 11b is installed in the sub hot water flow circuit "Ws". That is, when the valve 11b is opened, warmed engine cooling water is fed to the extra heat exchanger 30 to warm the refrigerant flowing in the exchanger 30.

As will be described in detail hereinafter, under heating operation of the air conditioning system, isoentropic compression is effectively carried out by the compressor 1 due to warming of the returning refrigerant. That is, effective heating is achieved by the air conditioning system.

A bypass circuit 31 is provided, which bypasses the extra heat exchanger 30 and has an Open/Close valve 32 installed therein. Due to provision of this bypass circuit 31, excessive warming of the returning refrigerant is suppressed. That is, by controlling the valve 32, abnormal discharging pressure of the compressor 1 is suppressed.

For controlling the valve 32, the temperature and pressure of the returning refrigerant, those of discharged refrigerant from the compressor 1 and over-heating degree of the returning refrigerant may be used as control factors. For achieving this control, various sensors are employed, which are fixed to inlet and outlet portions of the compressor 1 and outlet portions of the first and second heat exchangers 12 and 22. That is, if at least one of the sensors detects an abnormal condition of the refrigerant, a control unit (not shown) issues a control signal to the valve 32 to open the same.

By detecting the temperature, pressure and over-heating degree of the returning refrigerant, undesired overload of the closed refrigeration system is prevented.

In the following, operation of the dual air conditioning system 100A of the first embodiment will be described.
(1) Initial Stage of Heating Operation For heating both front and rear portions of a passenger room, the first Open/Close valve V1 is closed and the second Open/Close valve V2 is opened, and the valve 7 is turned to make the bypass circuit 3B operative while blocking the first condenser 3.

Upon energization of the compressor 1, the high temperature high pressure refrigerant discharged from the compressor 1 is forced to flow through the valve 7, the bypass circuit 3B, the liquid tank 4a, the second Open/Close valve V2, the second condenser 21, the liquid tank 4b, the second expansion valve 5b and the second heat exchanger 22 into the extra heat exchanger 30, and the refrigerant from the extra heat exchanger 30 is forced to return to the compressor 1.

During this flow, the valves 11a and 11b are both opened and thus engine cooling water is fed to both the heater core 11 and the extra heat exchanger 30. The temperature of the engine cooling water is gradually increased with increase of time.

Due to closed condition of the first Open/Close valve V1, the first heat exchanger 12 does not operate. However, air flowing in the air flow passage 10f of the first air conditioning unit 10 is somewhat warmed by the heater core 11 to which somewhat heated engine cooling water is being fed. Accordingly, somewhat warmed air is blown to the front portion of the passenger room.

In the second air conditioning unit 20, the high temperature and high pressure refrigerant from the compressor 1 is led through the second Open/Close valve V2 into the second condenser 21. Thus, heat exchange is carried out between the second condenser 21 and air flowing in the air flow passage 20f of the second air conditioning unit 20. After heating air, the refrigerant, which has medium temperature and high pressure, is subjected to an adiabatic expansion in the second expansion valve 5b to become a lower temperature lower pressure refrigerant and led into the second heat exchanger 22 which, serving as an evaporator, cools the air flowing in the air flow passage 20f. The low temperature low pressure refrigerant discharged from the second heat exchanger 22 is then led into the extra heat exchanger 30.

That is, air flowing in the air flow passage 20f of the second air conditioning unit 20 is cooled by the second heat exchanger 22 and then warmed by the second condenser 21, and thus, the second unit 20 feeds the rear portion of the passenger room with a conditioned (more specifically, dehumidified and warmed) air.

Due to provision of the extra heat exchanger 30, the heating effect of the second condenser 21 is much increased. That is, the low temperature low pressure refrigerant flowing in the extra heat exchanger 30 absorbs heat from surrounding air and the engine cooling water before being led back to the compressor 1. More specifically, before being compressed by the compressor 1, the returning refrigerant is warmed to a certain level at the second heat exchanger 22 and at the extra heat exchanger 30 while changing its entropy. That is, before being compressed, the returning refrigerant is subjected to two warming steps. Thus, the refrigerant discharged from the compressor 1 can have a higher temperature and thus the second condenser 21 can exhibit a higher heating effect. This effect becomes marked with increase of time.

Thus, instant warming for the rear portion of the passenger room is achieved.

With increase of time, the temperature of engine cooling water from the engine 2 increases, and thus, the heating effect of the heater core 11 in the air flow passage 10f of the first air conditioning unit 10 gradually increases. That is, after a while, the second unit 10 becomes to feed the front portion of the passenger room with a sufficiently warmed air.

(2) Stable Stage of Heating Operation

With increase of time, both the first and second units 10 and 20 become to provide the passenger room with sufficiently warmed air. Upon this, the first Open/Close valve V1 is opened to permit the high temperature high pressure refrigerant from the compressor 1 to flow also into the first heat exchanger 12 of the first unit 10 through the first expansion valve 5a. Thus, under this condition, the first heat exchanger 12 serves as an evaporator to cool air flowing in the air flow passage 10f of the first unit 10. That is, the first unit 10 feeds the front portion of the passenger room with a conditioned (more specifically, dehumidified and warmed) air.

Under this stable stage of heating operation, various heating modes are available by controlling the three Open/Close valves 11a, 11b and 32. Controlling these valves may be electrically achieved by using a control unit.

(2-1) First Mode

This mode is provided by opening the valves 11a and 11b and closing the valve 32. Under this mode, warmed engine cooling water from the engine 2 is fed not only to the heater core 11 through the main hot water flow circuit "Wm" but also to the extra heat exchanger 30 through the sub hot water flow circuit "Ws". Thus, the first and second units 10 and 20 can feed the passenger room with dehumidified and warmed air.

(2-2) Second Mode

This mode is provided by opening the valve 11a and closing the valves 11b and 32. Under this mode, due to open condition of the valve 11a, the first unit 10 can provide the front portion of the passenger room with dehumidified and warmed air. While, due to closed condition of the valve 11b, the extra heat exchanger 30 fails to receive the warmed engine cooling water, more specifically, the engine cooling water is retained in the extra heat exchanger 30. Thus, for a while, the refrigerant flowing in the extra heat exchanger 30 absorbs heat from the retained engine cooling water in the exchanger 30. However, with increase of time, quantity of heat possessed by the retained engine cooling water is gradually reduced. Thus, after passing a given time, normal heating operation of the dual air conditioning system is provided. That is, at an initial stage of this second mode, a relatively hot air is provided by the first and second units 10 and 20 and thereafter, the temperature of the air is gradually reduced to a normally hot level.

(2-3) Third Mode

This mode is provided by openings the valves 11a and 32 and closing the valve 11b. That is, the bypass circuit 31 for the extra heat exchanger 30 is opened. Under this mode, due to open condition of the valve 11a, the first unit 10 provides the front portion of the passenger room with dehumidified and warmed air like in the above-mentioned first and second modes. While, due to closed condition of the valve 11b and open condition of the valve 32, the refrigerant from the first and second heat exchangers 12 and 22 is forced to flow through the bypass circuit 31 as well as the extra heat exchanger 30. Due to this, heating effect applied to the refrigerant by the extra heat exchanger 30 is lowered and thus normal heating operation is provided by the dual air conditioning system. By selecting this third mode, the compressor 1 is prevented from producing an abnormally high pressure refrigerant.

It is to be noted that under heating operation the valve 11a is kept open.

(3) Cooling Operation

In this cooling operation, three modes are available by controlling the first and second Open/Close valves V1 and V2, which are a front cooling mode, a dual cooling mode and a rear is cooling mode. Under these modes, the valves 11a and 11b for the warmed engine cooling water are closed and the valve 32 is opened.

(3-1) Front Cooling Mode

For achieving this mode, the valve 7 is turned to a position to make the first condenser 3 operative while blocking the bypass circuit 3B. Then, the first Open/Close valve V1 is opened and the second Open/Close valve V2 is closed. With this, the high temperature high pressure refrigerant from the compressor 1 is forced to flow through the valve 7, the first condenser 3, the liquid tank 4a, the first Open/Close valve V1, the first expansion valve 5a, the first heat exchanger 12 to both the extra heat exchanger 30 and the valve 32, and the refrigerant from the extra heat exchanger 30 and the valve 32 returns to the compressor 1. With this circulation of the refrigerant, the first heat exchanger 12, serving as an evaporator, cools air flowing in the air flow passage 10f and thus provides the front portion of the passenger room with cooled air.

(3-2) Dual Cooling Mode

For achieving this mode, the valve 7 is turned to the position to make the first condenser 3 operative blocking the bypass circuit 3B, and the first and second Open/Close valves V1 and V2 are both opened. With this, the high temperature high pressure refrigerant from the compressor 1 is forced to flow through the valve 7 and the first condenser 3 into the liquid tank 4a, and one part of the refrigerant from the liquid tank 4a is forced to flow through the first Open/Close valve V1, the first expansion valve 5a and the first heat exchanger 12 to both the extra heat exchanger 30 and the valve 32, and the other part of refrigerant from the liquid tank 4a is forced to flow through the second Open/Close valve V2, the second condenser 21, the liquid tank 4b, the second expansion valve 5b and the second heat exchanger 22 to both the extra heat exchanger 30 and the valve 32. The refrigerant from both the extra heat exchanger 30 and the valve 32 is returned to the compressor 1. As a result of this circulation, the first heat exchanger 12, serving as an evaporator, cools air flowing in the air flowing passage 10f of the first unit 10, and the second heat exchanger 22, serving as an evaporator, cools air flowing in the air flowing passage 20f of the second unit 20. Thus, the first and second units 10 and 20 provide the front and rear portions of the passenger room with cooled air. It is to be noted that under this condition the second condenser 21 does not operate as a condenser because the refrigerant supplied thereto has been already condensed by the first condenser 3.

(3-3) Rear Cooling Mode

For achieving this mode, the valve 7 is turned to the position to make the first condenser 3 operative blocking the bypass circuit 3B, and the second Open/Close valve V2 is opened and the first Open/Close valve V1 is closed. With this, the high temperature high pressure refrigerant from the compressor 1 is forced to flow through the valve 7, the first condenser 3, the liquid tank 4a, the second Open/Close valve V2, the second condenser 21, the liquid tank 4b, the second expansion valve 5b and the second heat exchanger to both the extra heat exchanger 30 and the valve 32. The refrigerant from both the extra heat exchanger 30 and the valve 32 is returned to the compressor 1. As a result of this circulation, the second heat exchanger 22, serving as an evaporator, cools air flowing in the air flow passage 20f of the second unit 20. Thus, the second unit 20 provides the rear portion of the passenger room with cooled air. For the above-mentioned reason, under this condition, the second condenser 21 does not operate as a condenser.

Figure 4:
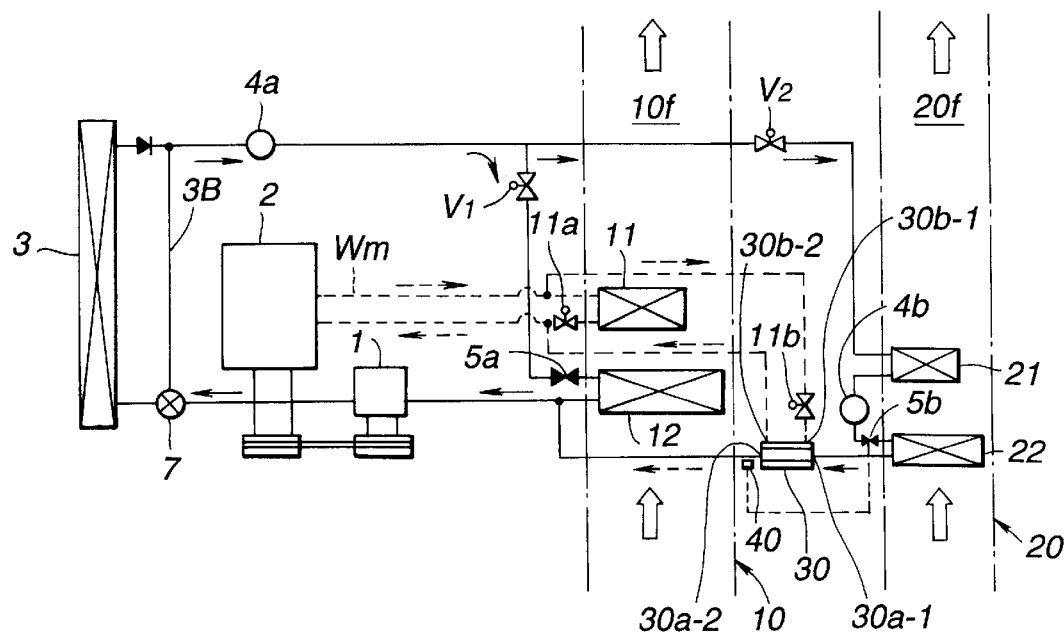
FIG. 4 is a view similar to FIG. 2, but showing an automotive dual air conditioning system which is a second embodiment of the present invention.

Referring to FIG. 4, there is shown an automotive dual air conditioning system 100B which is a second embodiment of the present invention.

Since the system 100B of this second embodiment is similar to the above-mentioned system 100A of the first embodiment, only portions and parts which are different from those of the first embodiment will be described in detail in the following. Substantially same portions and parts as those of the first embodiment 100A are denoted by the same numerals.

As is seen from FIG. 4, in this second embodiment 100B, there are no means which correspond to the bypass circuit 31 and the valve 32 which are used in the first embodiment 100A. Furthermore, the extra heat exchanger 30 is arranged in a refrigerant line just downstream of the second heat exchanger 22. As shown, a refrigerant line from the output of the extra heat exchanger 30 to connected to a refrigerant line which extends from an output of the first heat exchanger 12 to the compressor 1.

Figure 5:
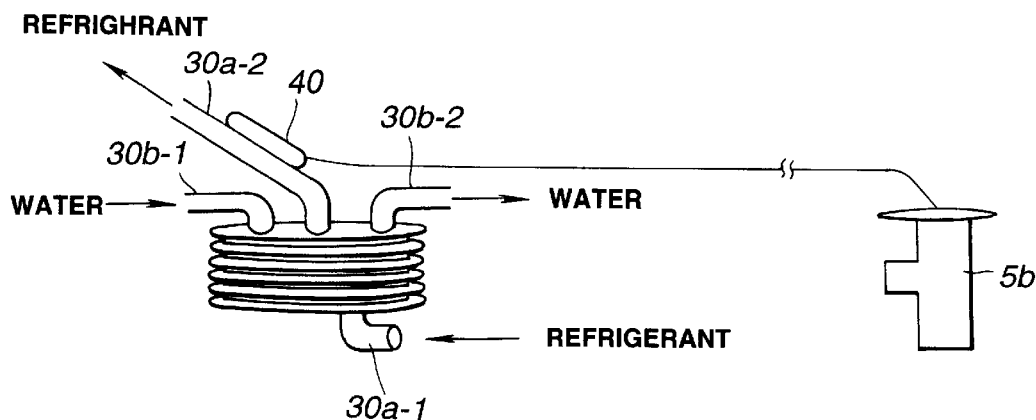
FIG. 5 is a view of an essential portion of the dual air conditioning system of the second embodiment.

As is well shown in FIG. 4, in this second embodiment 100B, there is employed a temperature sensor 40 which, for controlling an valve open degree of the second expansion valve 5b, senses the temperature of the refrigerant just discharged from the extra heat exchanger 30. That is, as is seen from FIG. 5, the temperature sensor 40 is mounted on the outlet line 30a-2 of the extra heat exchanger 30.

Although not shown in the drawings, a known controller is incorporated with the second expansion valve 5b to control the valve open degree of the same in accordance with an information signal issued from the temperature sensor 40.

That is, when the temperature of the refrigerant just discharged from the extra heat exchanger 30 is relatively high, the valve open degree of the second expansion valve 5b is increased, while, the temperature is relatively low, the open degree of the valve 5b is reduced.

As is known, higher temperature possessed by a refrigerant just fed to the compressor 1 means that the heat load of a refrigeration cycle is high. Thus, by increasing the valve open degree of the second expansion valve 5b, the amount of the refrigerant returned to the compressor 1 is increased thereby to feed the second closed refrigeration cycle with a greater amount of refrigerant. With this, appropriate cooling operation is achieved by the second unit 20. While, when the temperature of the refrigerant from the extra heat exchanger 30 is relatively low, the valve open degree of the second expansion valve 5b is reduced for suitably controlling the amount of refrigerant flowing in the second closed refrigeration cycle.

Operation of the system of the second embodiment 100B is substantially the same as that of the above-mentioned first embodiment 100A except the following.

That is, due to provision of the added measure including the temperature sensor 40 by which the valve open degree of the second expansion valve 5b is controlled, more precise cooling operation is carried out by the second unit 20, as is described hereinabove.

Figure 6:
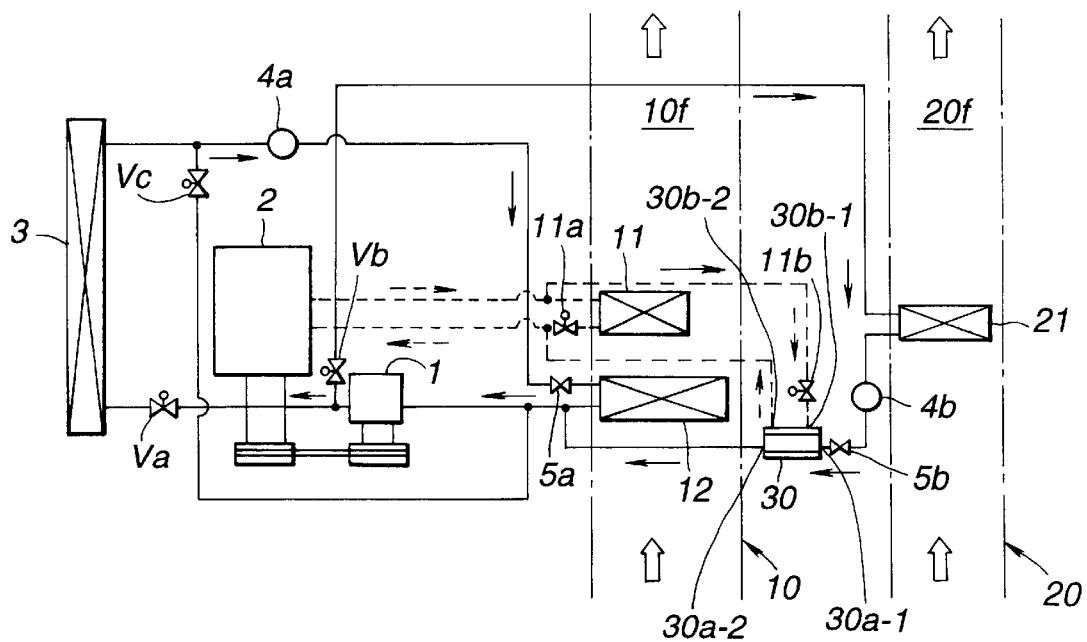
FIG. 6 is a view similar to FIG. 2, but showing an automotive dual air conditioning system which is a third embodiment of the present invention.

Referring to FIG. 6, there is shown an automotive dual air conditioning system 100C which is a third embodiment of the present invention.

Since the system 100C of this third embodiment is similar to the above-mentioned system 100B of the second embodiment, only portions and parts which are different from those of the second embodiment will be described in detail in the following. Substantially same portions and parts as those of the second embodiment 100B are denoted by the same numerals.

As is seen from FIG. 6, in this third embodiment 100C, there is no means corresponding to the second heat exchanger 22 used in the second embodiment 100B. That is, the outlet of the second condenser 21 is connected to the inlet line 30a-1 of the extra heat exchanger 30 through the liquid tank 4b and the second expansion valve 5b. Further, there is no means corresponding to the added measure (including the temperature sensor 40 by which the second expansion valve 5b is controlled) employed in the second embodiment 100B.

Furthermore, in the third embodiment 100C, a refrigerant line from the output of the compressor 1 to the first condenser 3 has a first Open/Close valve Va installed therein, a refrigerant line from the output of the compressor 1 to the inlet of the second condenser 21 has a second Open/Close valve Vb intalled therein, and a refrigerant line from the outlet of the outlet of the first heat exchanger 12 to the inlet of the liquid tank 4a has a third Open/Close valve Vc installed therein.

Due to removal of the second heat exchanger (22) from the second unit 20, the second unit 20 loses the cooling function. However, the second unit 20 can be produced compact in size and thus entire of the air conditioning system 100C of this third embodiment can be constructed compact in size.

In the following, operation of the dual air conditioning system 100C of the third embodiment will be described.

(1) Heating Operation

For heating both front and rear portions of a passenger room, the valves 11a and 11b are both opened and the first Open/Close valve Va is closed and then the second Open/Close valve Vb is opened. Thus, engine cooling water is fed to the heater core 11. However, in the initial heating stage, the heater core 11 of the first unit 10 fails to exhibit a satisfied heating function due to lack of heat possessed by the engine cooling water.

Upon energization of the compressor 1, the high temperature high pressure refrigerant discharged from the compressor 1 is forced to flow through the second Open/Close valve Vb, the second condenser 21, the liquid tank 4b and the second expansion valve 5b into the extra heat exchanger 30, and the refrigerant from the extra heat exchanger 30 is forced to return to the compressor 1. Thus, heat exchange is carried out between the second condenser 21 and air flowing in the air flow passage 20f of the second unit 20. After heating air, the refrigerant, which has medium temperature and high pressure, is subjected to an adiabatic expansion in the second expansion valve 5b to become a lower temperature lower pressure refrigerant and led into the extra heat exchanger 30. That is, by the second condenser 21, the air flowing in the air flow passage 20f of the second unit is warmed.

Due to provision of the extra heat exchanger 30, the heating effect of the second condenser 21 is much increased. That is, the low temperature low pressure refrigerant flowing in the extra heat exchanger 30 absorbs heat from surrounding air before being led back to the compressor 1. That is, before being compressed by the compressor 1, the returning refrigerant is warmed to a certain level changing its entropy. Thus, the second condenser 21 can exhibit a higher heating effect. This effect becomes marked with increase of time.

Thus, instant warming for the rear portion of the passenger room is achieved.

With increase of time, the temperature of engine cooling water increases, and thus, the heating effect of the heater core 11 of the first unit 10 gradually increases. Thus, after a while, the second unit 10 becomes to feed the front portion of the passenger room with a sufficiently warmed air.

With increase of time, the temperature of the engine cooling water increases thereby gradually increasing the heating effect of the extra heat exchanger 30. Thus, the heating effect of the second condenser 21 is increased with increase of time.

The refrigerant condensed by the second condenser 21 is stored by the liquid tank 4b, so that the amount of refrigerant flowing in the refrigerant line of the second unit 20 is appropriately controlled.

(2) Cooling Operation

Cooling operation is carried out by only the first air conditioning unit 10.

For starting the cooling operation, the third Open/Close valve Vc is opened to return the refrigerant, which has been remained in the first condenser 3, to the compressor 1. Then, the first Open/Close valve Va is opened and the second and third Open/Close valves Vb and Vc are closed. Then, the compressor 1 is operated. Upon this, the high temperature high pressure refrigerant from the compressor 1 is forced to flow through the first Open/Close valve Va, the first condenser 3, the liquid tank 4a and the first expansion valve 5a into the first heat exchanger 12, and the refrigerant from the first heat exchanger 12 is forced to return to the compressor 1.

With this circulation of the refrigerant, the first heat exchanger 12, serving as an evaporator, cools air flowing in the air flow passage 10f and thus provides the front portion of the passenger room with cooled air.

The refrigerant condensed by the first condenser 3 is stored by the liquid tank 4a, so that the amount of refrigerant flowing in the refrigerant line of the first unit 10 is appropriately controlled.

Figure 7:
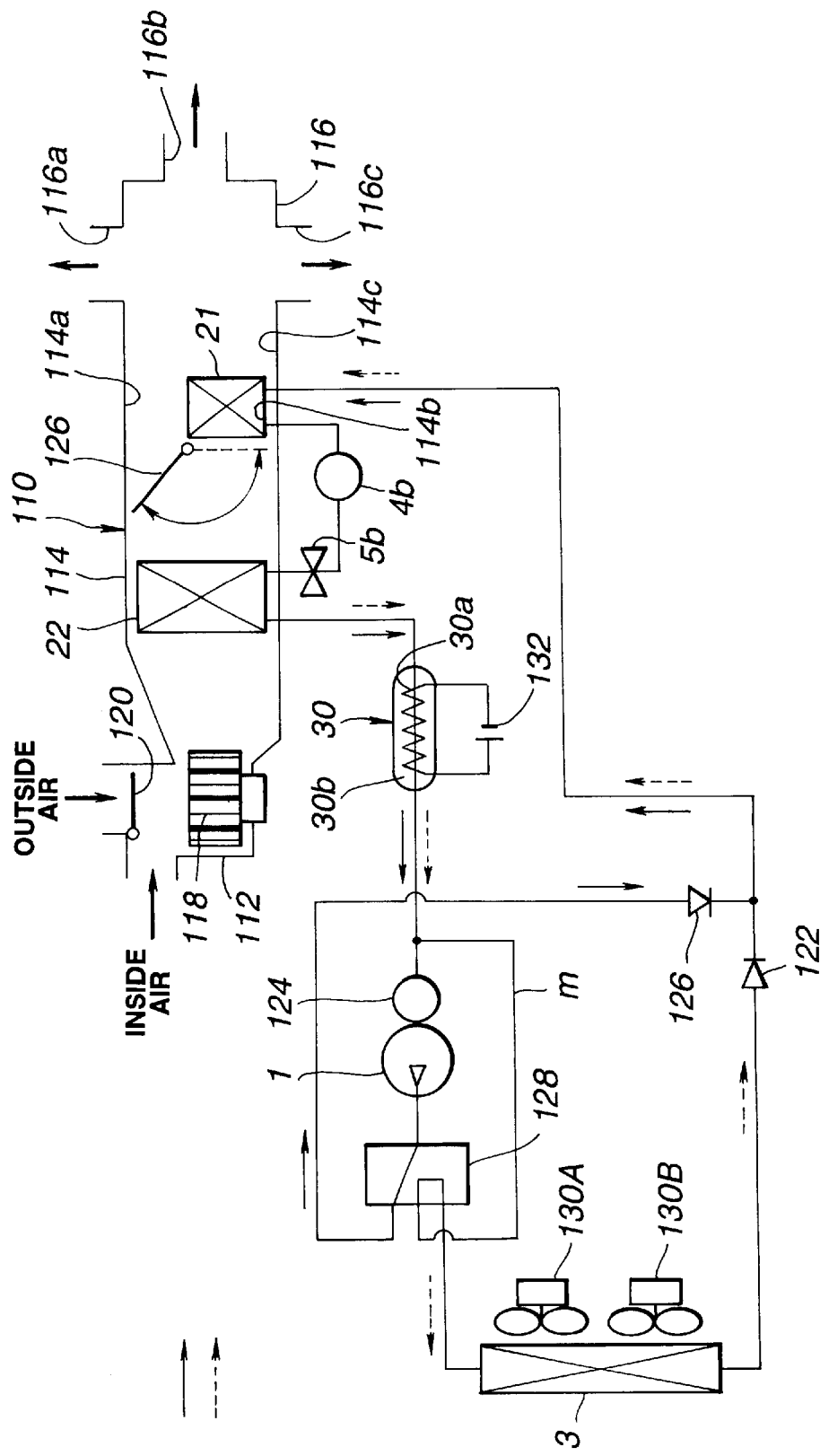
FIG. 7 is a schematically illustrated circuit of an air conditioning system of a double function type, which is a fourth embodiment of the present invention, which is suited for an electric vehicle.

Referring to FIGS. 7 to 17, particularly FIG. 7, there is shown an air conditioning device 100D suitable for an electric vehicle, which is a fourth embodiment of the present invention.

As will become apparent as the description proceeds, a so-called heat pump type air conditioning is practically used in the fourth embodiment. Also in this fourth embodiment 100D, under heating operation, the refrigerant just fed back to a compressor is heated (or warmed) by heating means like in the above-mentioned first, second and third embodiments 100A, 100B and 100C. But, in this fourth embodiment, the heating means is an electric heater.

As is shown in FIG. 7, the air conditioning device 100D of this fourth embodiment comprises an air duct case 110 which includes an air intake part 112, a main body part 114 and an air distribution part 116. As shown, within the air intake part 112, there is installed an electric blower 118 by which outside air and/or inside air is introduced into the main body part 114 through an intake door 120. Within the main body part 114, there are installed an evaporator (heat exchanger) 22 and a second condenser 21. The evaporator 22 is positioned upstream of the second condenser 21. Due to provision of the second condenser 21, there are defined in the main body part 114 two air passages, one being a cooled air passage 114a bypassing the second condenser 21 and the other being a hot air passage 114b passing the second condenser 21. An air mix door 126 is pivotally installed in the main body part 114 in a manner to change a rate in open degree between the two passages 114a and 114b. Behind the two passages 114a and 114b, there is defined an air mix chamber 114c which is provided in the air distribution part 116. The air distribution part 116 has two outlet ports, which are a defroster port 116a directed toward an inner surface of a windshield (not shown), a ventilation port 116b directed to a front portion of a passenger room and a hoot port 116c directed to a lower portion of the passenger room. Although not shown in the drawing, respective doors are incorporated with these three ports 116a, 116b and 116c to obtain various air conditioning modes.

The evaporator 22 and the second condenser 21 constitute parts of a closed refrigeration/heat pump system that circulates refrigerant under pressure. That is, the system comprises two systems which are selectable, one being a closed refrigeration system including a compressor 1, a first condenser 3, a check valve 122, the second condenser 21, a liquid tank 4b, an expansion valve 5b, the evaporator 22 and an accumulator 124, the other being a heat pump system including the compressor 1, a check valve 126, the second condenser 21, the liquid tank 4b, the expansion valve 5b, the evaporator 22 and the accumulator 124. Due to usage of the accumulator 124, only gaseous refrigerant is led to the compressor 1.

For switching the two systems, a four-way valve 128 is used which is arranged just downstream of the compressor 1, as shown. The four-way valve 128 has a first outlet directed to an inlet of the first condenser 3 for the closed refrigeration system and a second outlet directed to the check valve 126 for the heat pump system. A return circuit "m" is provided which extends from the first outlet of the four-way valve 128 to an inlet of the accumulator 124.

Electric fans 130A and 130B are arranged for cooling the first condenser 3.

In the fourth embodiment 100D, there is further provided an extra evaporator 30 which is arranged in a refrigerant line between the an outlet of the evaporator 22 and the inlet of the accumulator 124. The extra evaporator 30 is placed outside of the air duct case 110, that is, for example, in a motor room of an associated electric vehicle. The extra evaporator 30 is equipped with an electric heater 30a powered by a high power battery 132 (for example, DC:336V) of the electric vehicle. A heat conductive material 30b is installed in the extra evaporator 30. Upon energization of the electric heater 30a, the returning refrigerant from the evaporator 22 is heated or at least warmed.

In the following, operation of the air conditioning system 100D of the fourth embodiment will be described.

(1) Cooling Operation

For achieving this operation, the four-way valve 128 is turned to connect the outlet thereof to the inlet of the first condenser 3. Upon energization of the compressor 1, the high temperature high pressure refrigerant from the compressor 1 is led into the first and second condensers 3 and 21 to be liquefied and then led through the liquid tank 4b to the expansion valve 5b. Thus, the liquefied refrigerant is expanded in the evaporator (heat exchanger) 22 to cool air flowing therethrough. Thus, the air conditioning device 100D provides the passenger room with cooled air. It is to be noted that due to nature of this system, the second condenser 21 produces substantially no heat.

Under this cooling operation, the extra evaporator 30 is not heated by the heater 30a.

(2) Heating Operation

For achieving this operation, the four-way valve 128 is set to connect the outlet thereof with the refrigerant line for the check valve 126. Upon energization of the compressor 1, the high temperature and high pressure refrigerant from the compressor 1 is led through the check valve 126 to the second condenser 21 where the refrigerant becomes liquefied while radiating heat. Thus, air flowing through the second condenser 21 is warmed. The liquefied refrigerant is then expanded at the expansion valve 5b and thus the refrigerant absorbs heat from surrounding at the evaporator (heat exchanger) 22. Thus, air flowing through the evaporator 22 is cooled and dehumidified.

That is, the air conditioning device 100D feed the passenger room with a conditioned (more specifically, dehumidified and warmed) air. By controlling the air mix door 126, the temperature of the conditioned air is changed.

During this heating operation, the extra evaporator 30 is kept heated to heat or at least warm the returning refrigerant.

Thus, as has been mentioned hereinabove, the heating effect of the second condenser 21 is increased. Furthermore, due to the heat conductive material 30b installed in the extra evaporator 30, the heating effect of the second condenser 21 is much promoted.

Preferably, the valve open degree of the expansion valve 5b is controlled by the temperature of the refrigerant which is just discharged from the extra evaporator 30. By using this method, it becomes possible that the amount of refrigerant fed to the evaporators 22 and 30 is so controlled as to allow the refrigerant just led into the compressor 1 to assume a suitable super heated condition.

As is described hereinabove, under heating operation, in the extra evaporator 30, the returning refrigerant is heated or at least warmed by the electric heater 30a while being evaporated.

Thus, the refrigerant discharged from the compressor 1 has a much higher temperature and thus the second condenser 21 can exhibit a much higher heating effect. That is, instant warming of the passenger room is possible.

Furthermore, if the valve open degree of the expansion valve 5b is controlled by the temperature possessed by the refrigerant just discharged from the extra evaporator 30, the amount of refrigerant flowing in the heat pump system is increased when the extra evaporator 30 is heated by the heater 30a. This promotes the heating effect of the second condenser 21.

Furthermore, due to heating of the returning refrigerant by the electric heater 30a, the refrigerant to be led into the compressor 1 can have a completely gaseous phase, which improves the durability of the compressor 1.

As is mentioned hereinabove, the extra evaporator 30 is placed in an open area of the electric vehicle, for example, in the motor room of the electric vehicle.

Referring to FIGS. 8 to 11, there is clearly shown the extra evaporator 30 used in the fourth embodiment 100D.

Figure 8:
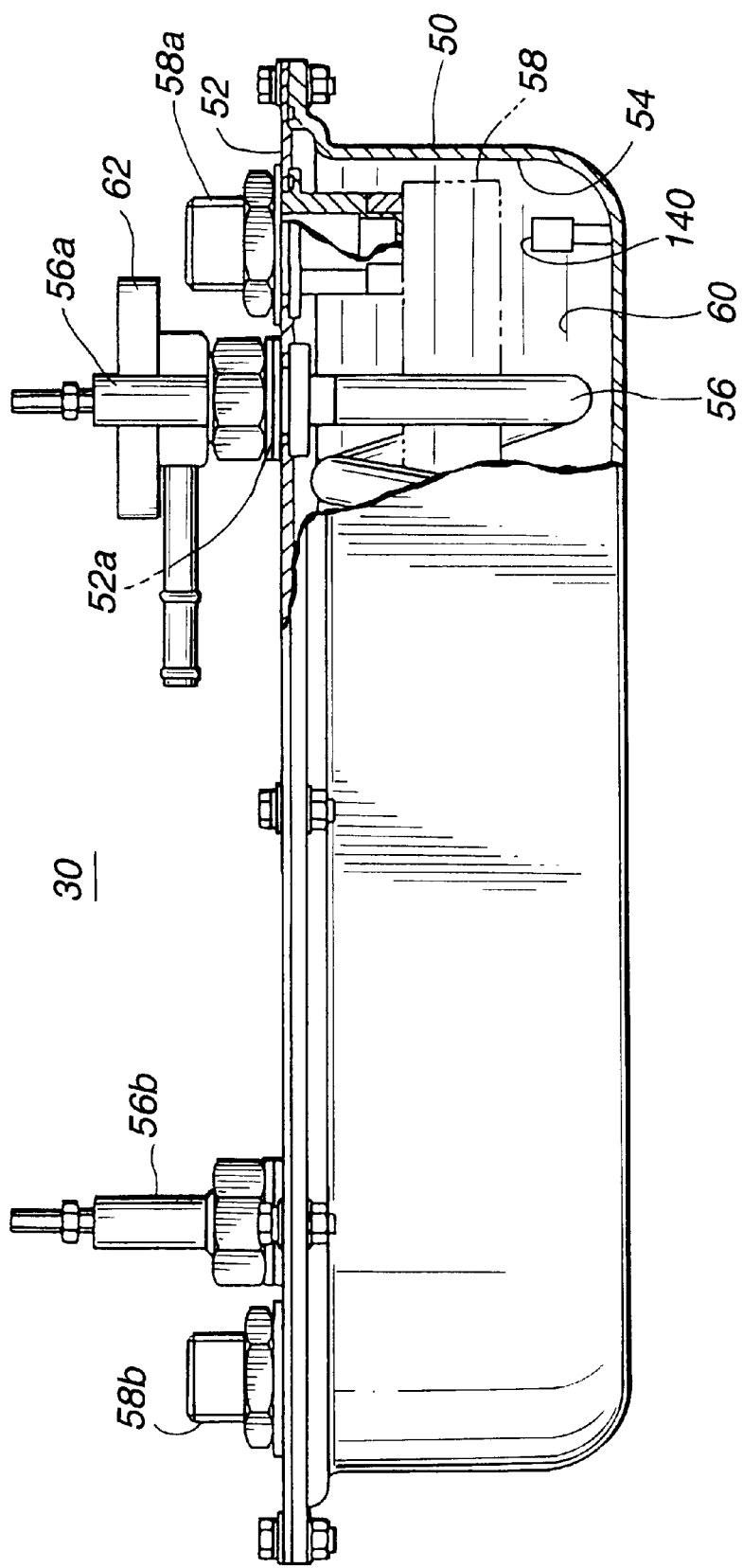
FIG. 8 is a partially sectioned side front view of an extra evaporator which is employed in the system of the fourth embodiment.
Figure 9:
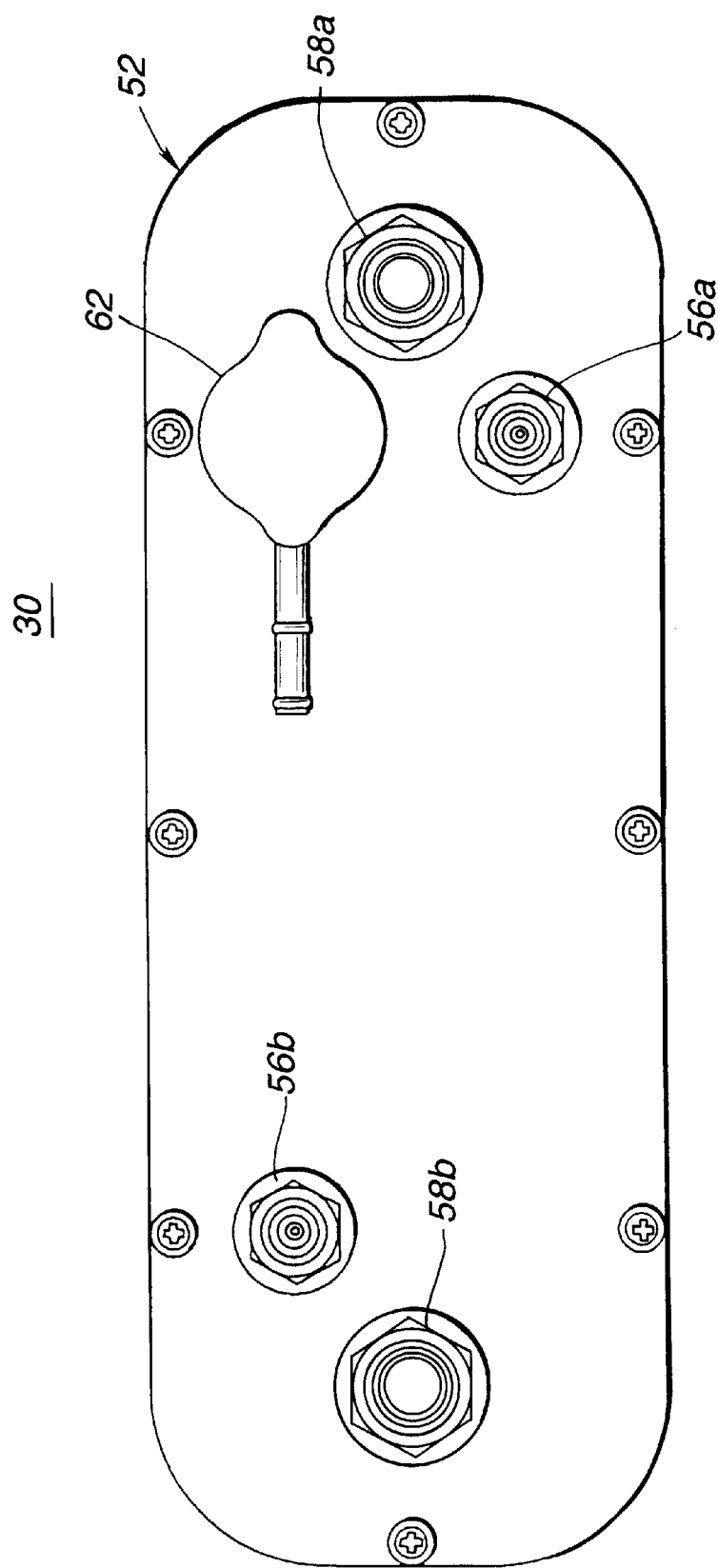
FIG. 9 is a plan view of the extra evaporator.

As is best seen from FIG. 8, the extra evaporator 30 comprises an elongate case 50 which is equipped with a lid 52 to define a sealed chamber 54 therein. Within the chamber 54, there are installed a spiral sheathed heater 56 and a straight refrigerant flow tube 58. These heater 56 and the tube 58 are longitudinally arranged in the elongate case 50. The refrigerant flow tube 58 is coaxially surrounded by the spiral sheathed heater 56. The sealed chamber 54 is filled with a liquid coolant 60. The refrigerant flow tube 58 has at both ends respective connector pipes 58a and 58b which are exposed to the outside of the case 50. The pipe 58a is connected to the outlet port of the evaporator 22 and the other pipe 5b is connected to the inlet port of the accumulator 124.

Figure 11:
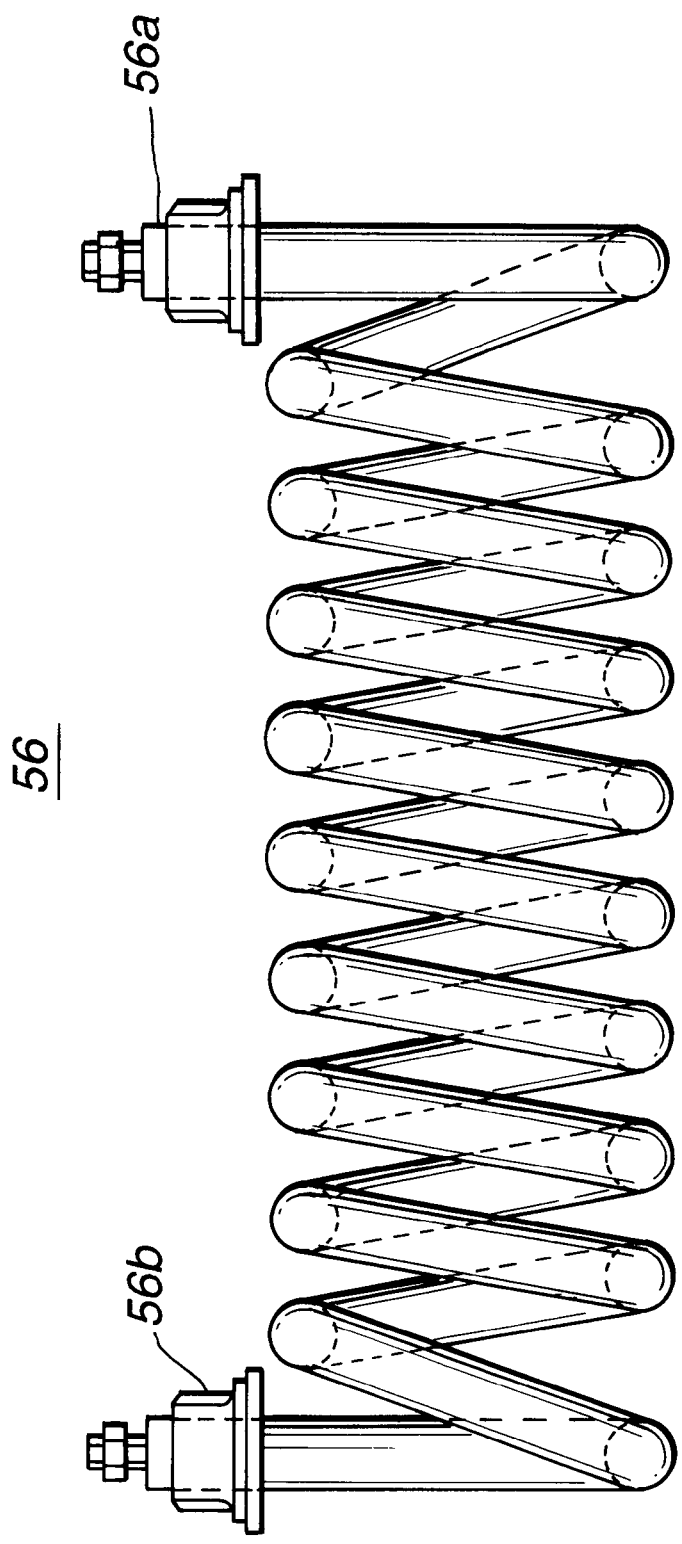
FIG. 11 is a front view of a spiral sheathed heater installed in the extra evaporator.

The spiral sheathed heater 56 is clearly shown in FIG. 11, which comprises a nichrome wire received in a spiral metal sheath. The metal sheath has a heat resistant insulating material contained therein. As is seen from FIGS. 8 and 11, the sheathed heater 56 has at both ends respective terminal ends 56a and 56b which are exposed to the outside of the case 50. The terminal end 56a is connected to one pole of the vehicle-mounted battery and the other terminal end 56b is connected to an electric control device.

Figure 10:
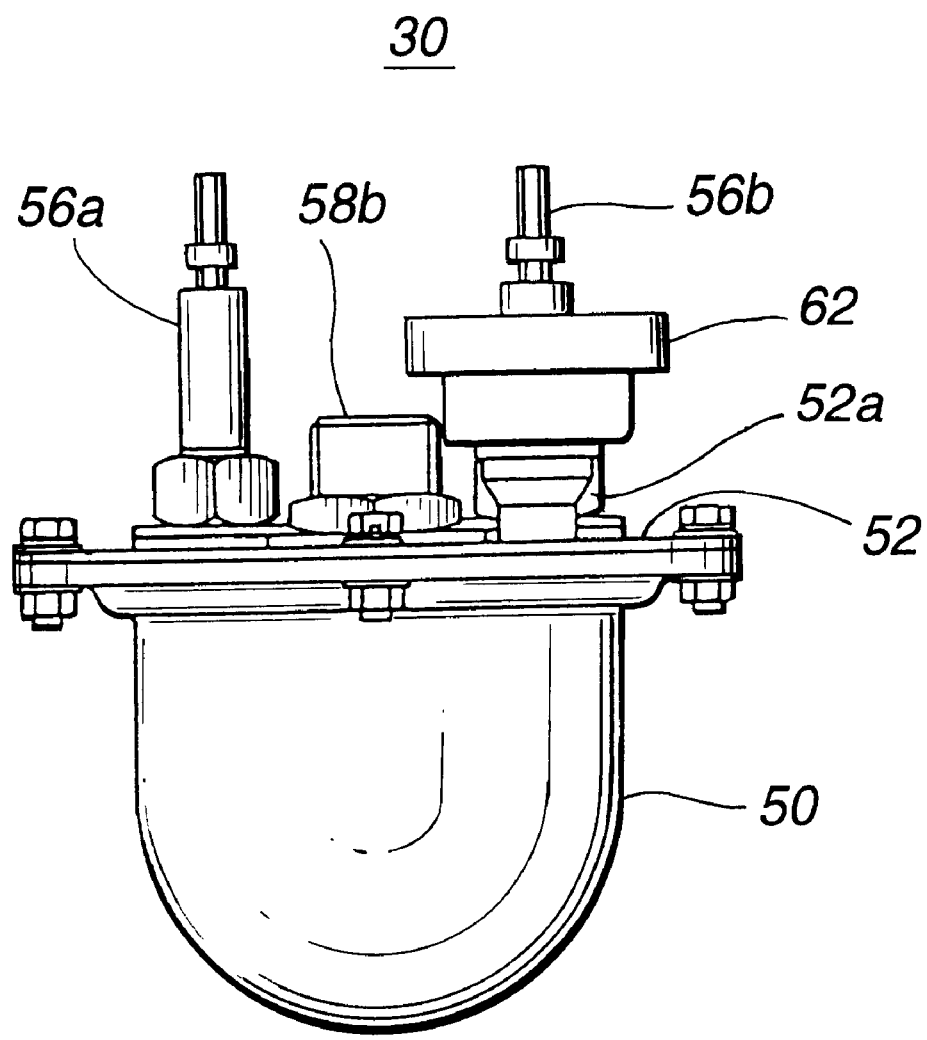
FIG. 10 is a side view of the extra evaporator.

As is understood from FIGS. 8 and 10, the lid 52 is equipped with an inlet opening 52a for pouring the liquid coolant 60 into the case 50. The inlet opening 52a is equipped with a safety valve 62 which automatically opens when the temperature of the liquid coolant 60 is abnormally increased. A temperature sensor 140 is set in the case 50 to detect the temperature of the liquid coolant 60. As will be described hereinafter, operation of the sheathed heater 56 is controlled by the temperature sensor.

Due to usage of the liquid coolant 60 having a marked thermal capacity, the refrigerant flow tube 58 is prevented from being directly affected by ON/OFF operation of the electric heater 56. With this, stable heating is obtained from the air conditioning device 100D.

As is described hereinabove, the heater 56 and the tube 58 are longitudinally arranged in the elongate case 50. With this arrangement, desirable free convection of the liquid coolant 60 tends to occur. That is, such convection promotes a phenomenon wherein the coolant 60 has an equalized temperature therethroughout. This equalization brings about stable heat application to the returning refrigerant, and thus, stable heating effect is achieved by the second condenser 21. Furthermore, undesired hunting of the heat pump system is suppressed.

If desired, suitable stirring means, such as an electric fan or the like, for stirring the liquid coolant 60 in the case 50 may be provided.

Figure 12:
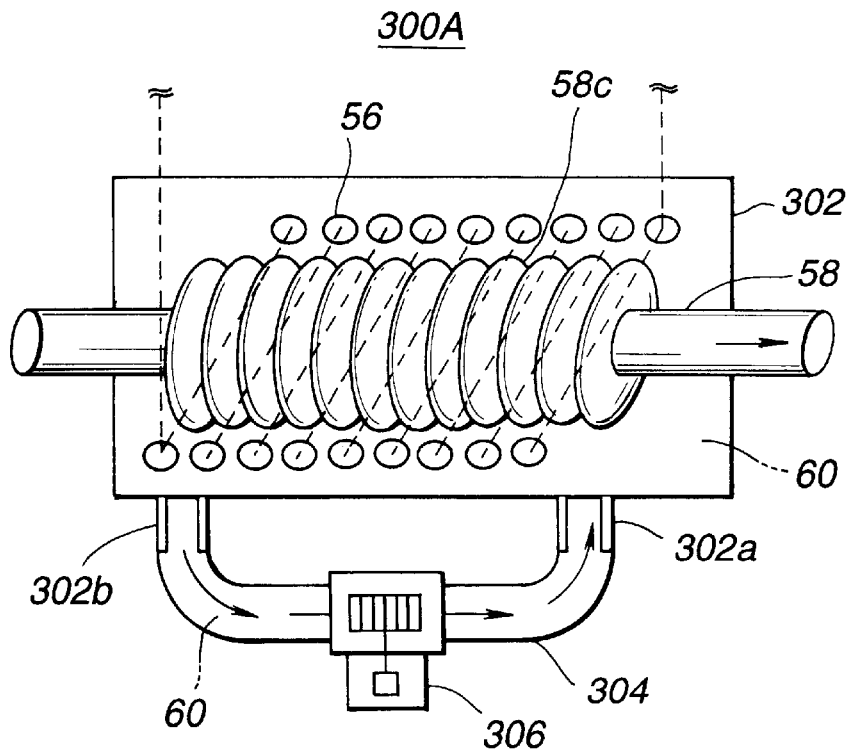
FIG. 12 is a sketch showing a modification of the extra evaporator usable in the fourth embodiment.
Figure 13:
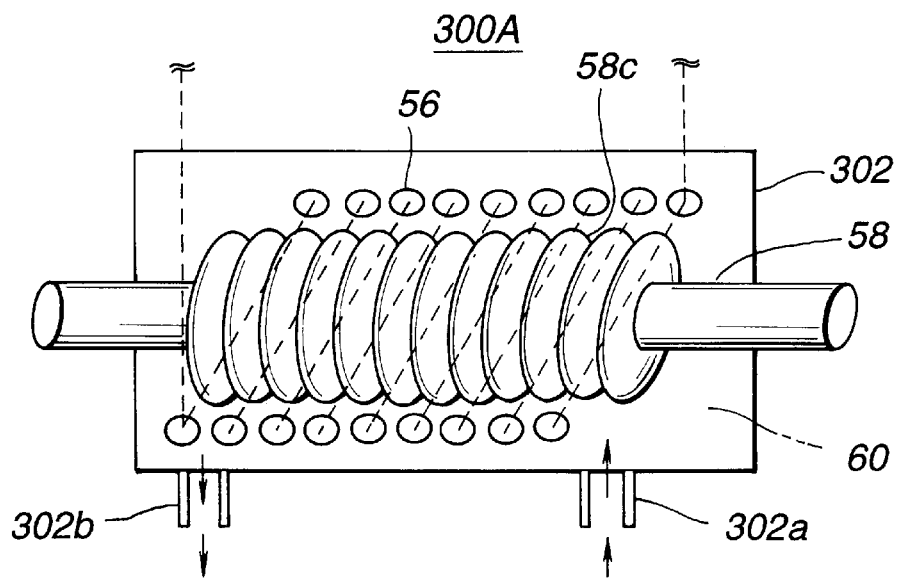
FIG. 13 is a sketch of the modification with some parts removed.
Figure 14:
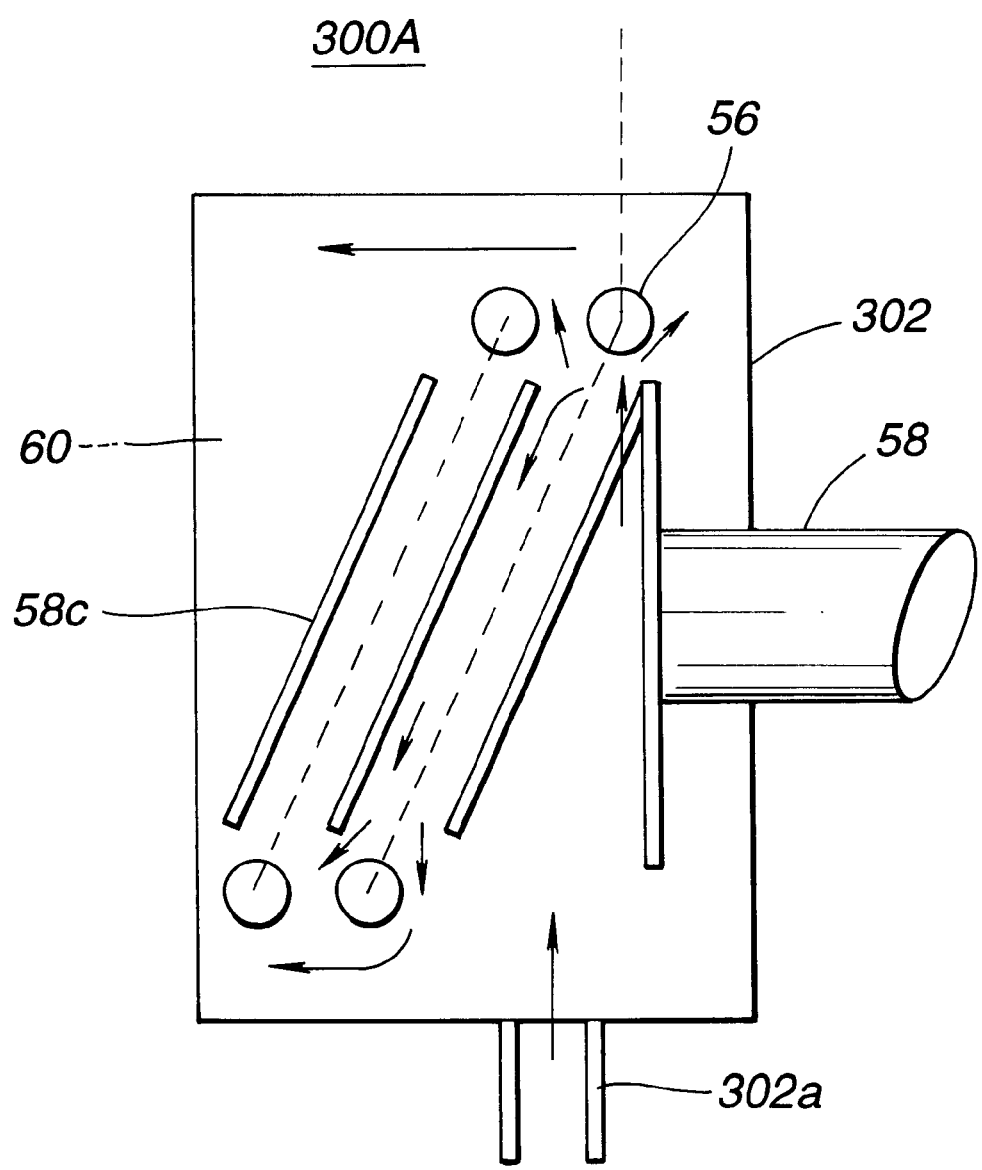
FIG. 14 is a schematic view of a right-side portion of the modification.

FIGS. 12 to 14 show an extra evaporator 300A which has such stirring means incorporated therewith.

As is seen from FIG. 12, the extra evaporator 300A comprises a container 302 filled with a liquid coolant 60, a spiral sheathed heater 56 installed in the container 302 and a straight refrigerant flow tube 58 surrounded by the spiral heater 56, like in the case of the above-mentioned extra evaporator 30 of FIG. 8. The refrigerant flow tube 58 has a spiral fin 58c disposed thereon to increase a contact area with the liquid coolant 60. That is, with the fin 58c, heat transmission from the liquid coolant 60 to the tube 58 is improved. Furthermore, the spiral shape possessed by the fin 58c promotes a convection which would take place by the liquid coolant 60. That is, the liquid coolant 60 is forced to flow around the refrigerant flow tube 58 using the fin 58a as a guide. If desired, the flow tube 58 may be provided therein with fins.

As is seen from FIG. 12, the container 302 has inlet and outlet openings 302a and 302b which are connected to a tube 304. An electric pump 306 is disposed in the tube 304. Thus, upon energization of the pump 306, the liquid coolant 60 is driven in the tube 304 in a direction as indicated by arrows thereby stirring the coolant 60 in the container 302.

Figure 15:
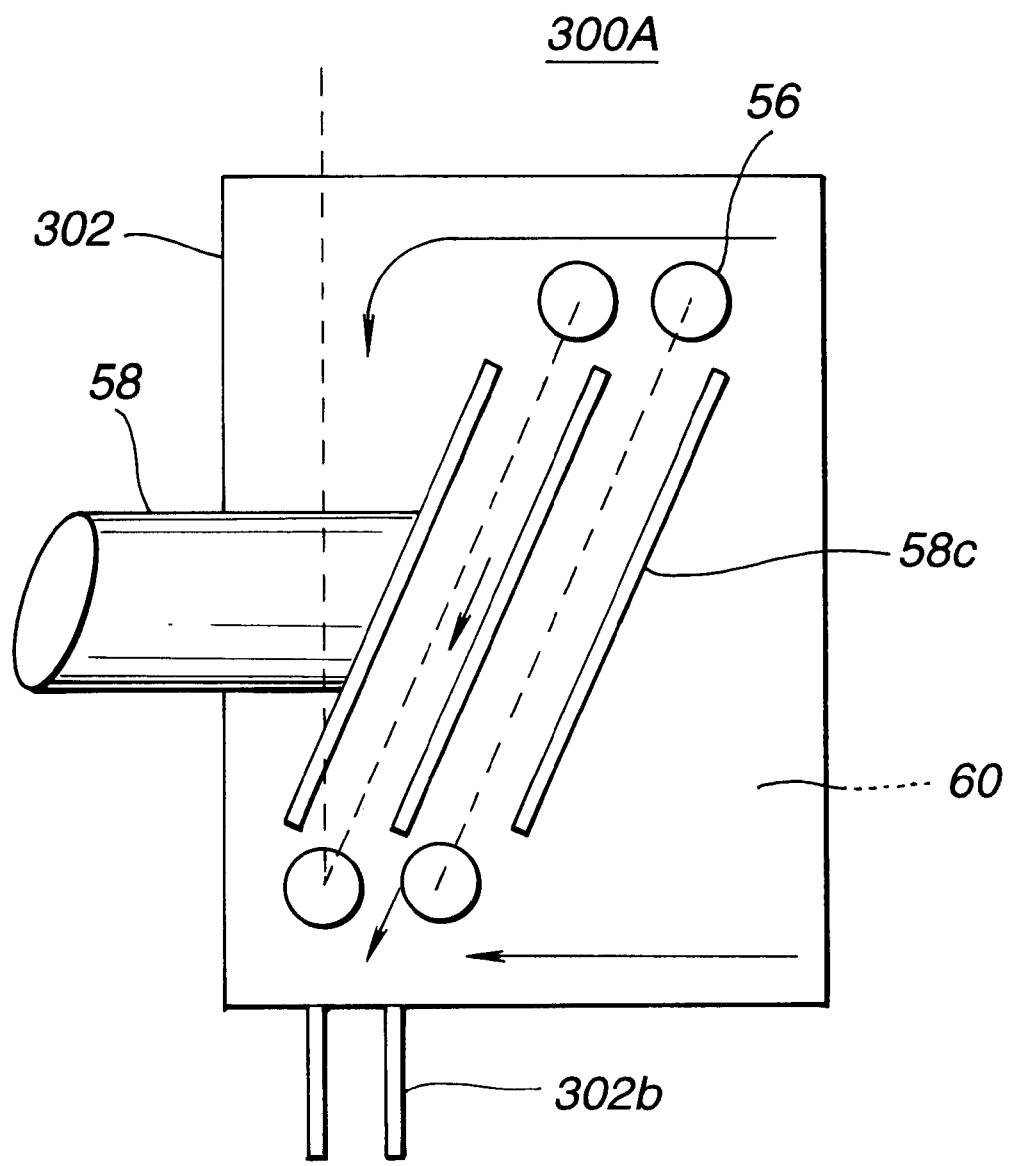
FIG. 15 is a schematic view of a left-side portion of the modification.

As will be understood from FIGS. 14 and 15, the liquid coolant 60 led into the interior of the container 302 from the inlet opening 302a is forced to flow toward one end part of the fin 58c and thereafter flow around the refrigerant flow tube 58 using the fin 58c as a guide toward the other end part of the fin 58c where the outlet opening 302b is positioned. For effectively achieving this flow, it is preferable to separate the fin 58c from the spiral sheathed heater 56 by about 3 to 4 mm.

Figure 16:
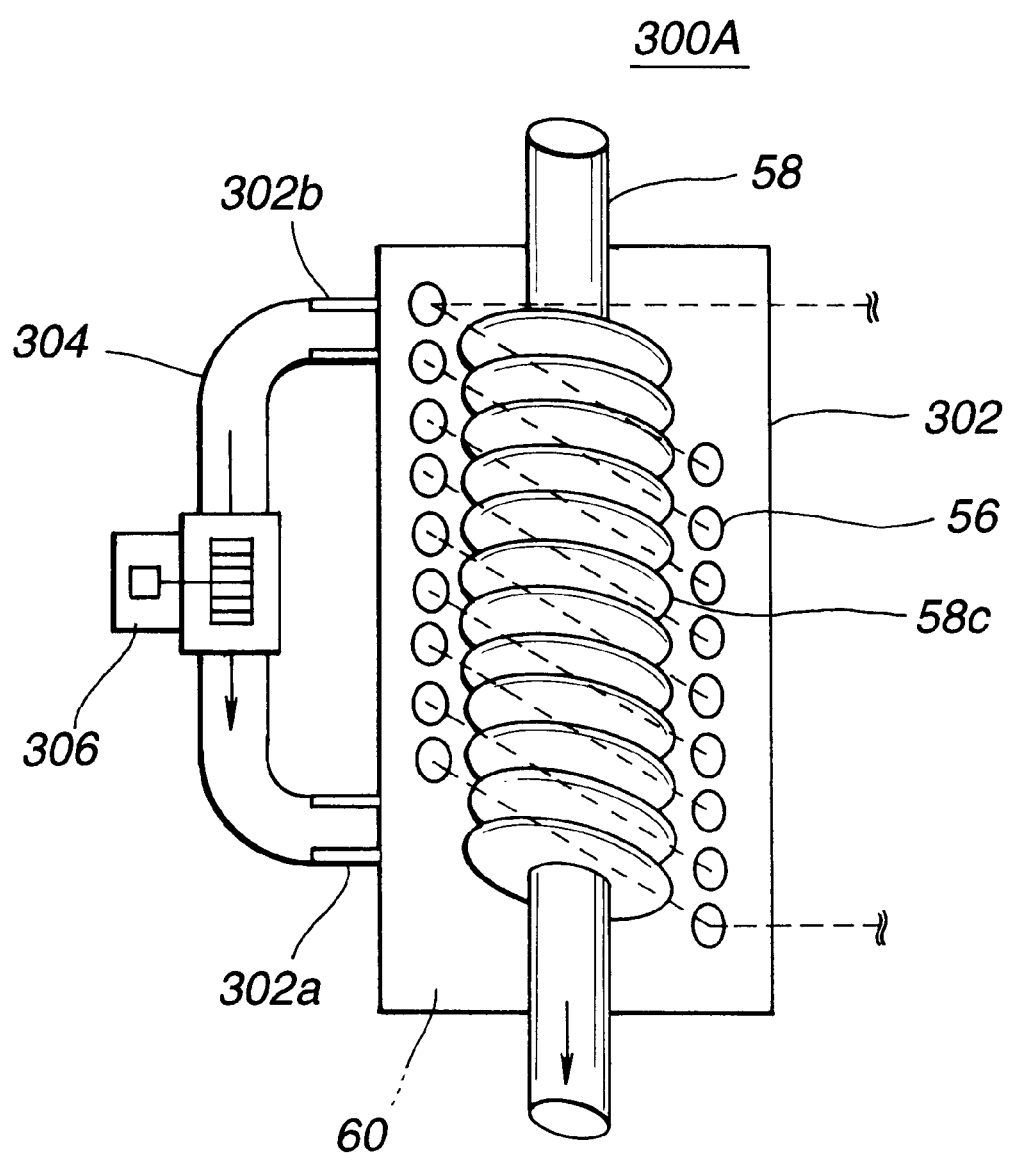
FIG. 16 is a view showing the modification arranged vertically.

FIG. 16 shows a case wherein the extra evaporator 300A is vertically arranged with the refrigerant flow tube 58 extending vertically. Also in this case, desired stirring for the coolant 60 is obtained.

Figure 17:
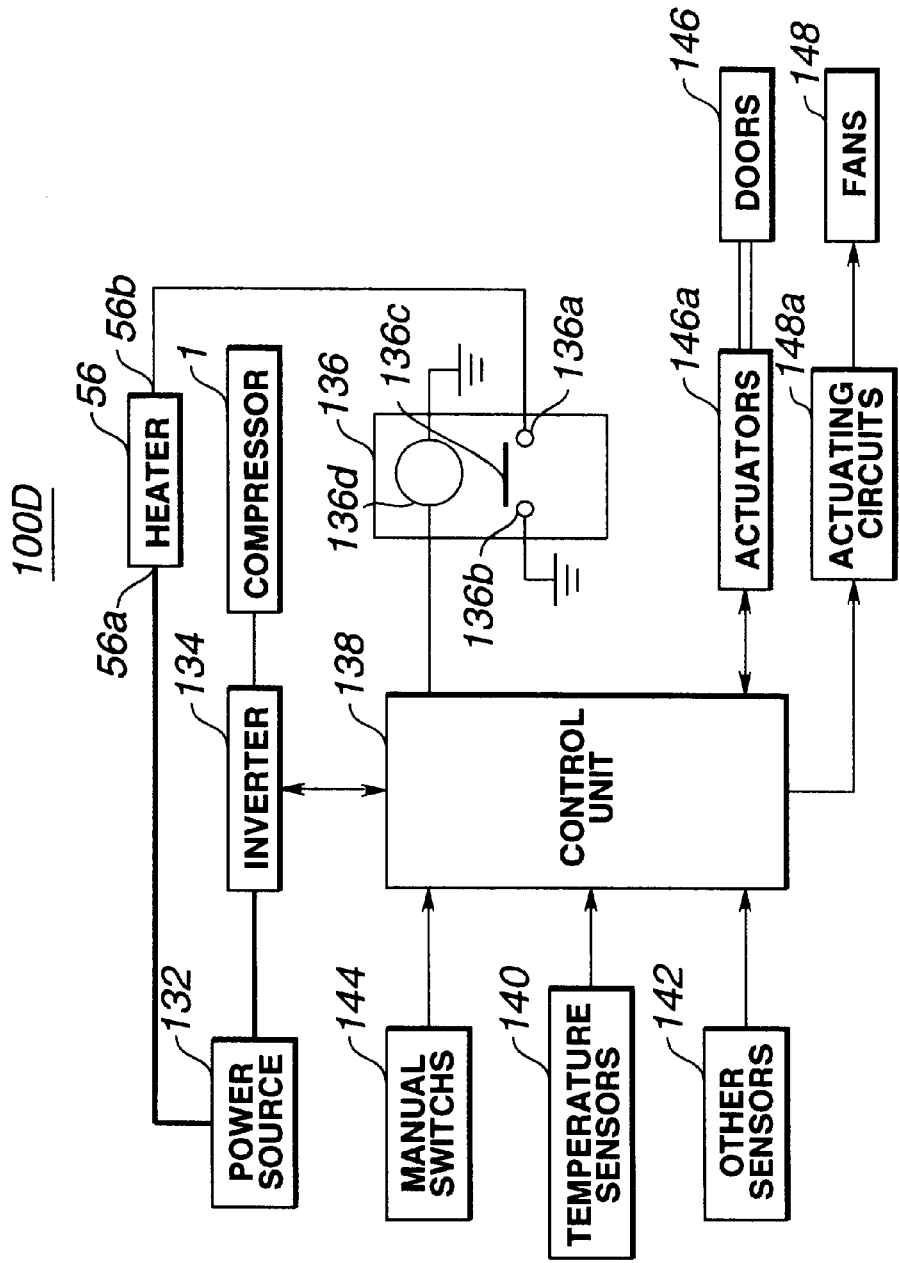
FIG. 17 is a block diagram of a control circuit employed in the double function type air conditioning device of the fourth embodiment.

Referring to FIG. 17, there is shown a block diagram of a control circuit employed in the air conditioning device 100D.

As shown, the compressor 1, more specifically, an electric motor for the compressor 1, is connected to one terminal of the electric power source (viz., high power battery) 132 through an inverter 134. The other terminal of the battery 132 is grounded, that is, connected to a chassis of the electric vehicle. The terminal end 56a of the sheathed heater 56 of the extra evaporator 30 is connected to one terminal of the of battery 132, while the other terminal end of the heater 56 is connected to one terminal 136a of a relay 136. The other terminal 136b of the relay 136 is connected to the chassis of the vehicle. The two terminals 136a and 136b are connectable by an armature 136c. For driving the armature 136c, the relay 136 has a coil 136d one terminal of which is connected to the chassis and the other terminal of which is connected to a control unit 138. Accordingly, the operation of the sheathed heater 56 is controlled in ON/OFF manner by the control unit 138. The control unit 138 is of a microcomputer, which is constructed to control the air conditioning device 100D in an integrated manner. The control unit 138 is driven by a power from the inverter 134. Information signals from various sensors are processed by the control unit 138 for integrally controlling various devices. The sensors are, for example, the temperature sensor 140 for the liquid coolant 60 in the extra evaporator 30, and other known sensors 142 for sensing the temperature of outside air and inside air, the quantity of solar radiation and the temperature of air which has just passed through the evaporator 22 in the air duct case 110. Information signals from various manual switches 144 on a control panel are also fed to the control unit 138. Furthermore, information signals from position sensors 146 for the various damper doors of the air duct case 110 are fed to the control unit 138. Upon processing the information signals applied thereto, the control unit 138 controls various display devices in the control panel, the positions of the damper doors of the air duct case 110 and various electric fans 148 arranged in the air conditioning device. For controlling the positions of the damper doors, various actuators 146a are provided, and for controlling the electric fans 148, various actuating circuits 148a are provided, as shown.

In the air conditioning device 100D, the control unit 138 is so arranged that when, under heating operation, the temperature of the returning refrigerant which has just entered the compressor 1 is lower than a predetermined level, the relay 136 becomes ON to energize the heater 56 for the extra evaporator 30. More specifically, the control unit 138 controls the heater 56 in accordance with information signals from the temperature sensor 140 in the extra evaporator 30.

Figure 18:
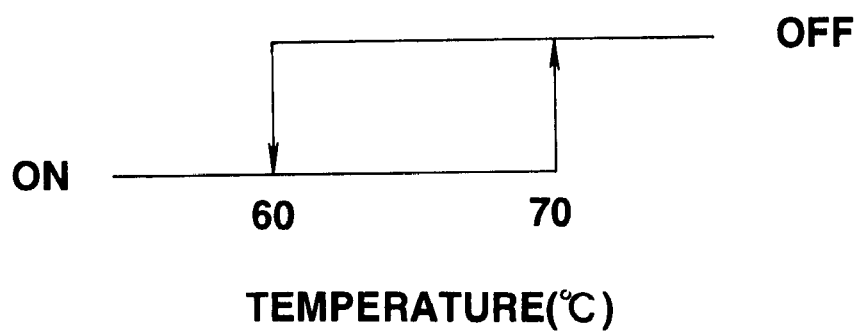
FIG. 18 is a chart showing ON/OFF characteristic of the spiral sheathed heater.

FIG. 18 is a chart for showing ON/OFF operation of the spiral sheathed heater 56 in accordance with the temperature of the returning refrigerant. As is understood from the chart, when due to energization of the heater 56, the temperature of the returning refrigerant is heated up to 70□ C, the energiation is stopped, while when the temperature of the returning refrigerant is lowered to 60□°C, the heater 56 is energized.

What is claimed is:

1. A dual air conditioning system for a motor vehicle powered by an internal combustion engine, comprising:
    a compressor;
    a two-way valve coupled to an output of said compressor, said two-way valve having a first output port and a second output port;
    a first condenser coupled to the first output port of said two-way valve;
    a bypass path coupled to the second output port of said two-way valve;
    a liquid tank arranged between said first condenser and a first expansion valve, wherein the bypass path provides a bypass of said first condenser so as to couple an output of said compressor to an input of said liquid tank while bypassing said first condenser;
    a first piping coupled on one end to said liquid tank;
    a first open/close valve provided on said first piping;
    a first heat exchanger provided on said first piping;
    said first expansion valve provided on said first piping;
    a second piping coupled on one end to said liquid tank;
    a second open/close valve provided on said second piping;
    a second condenser provided on said second piping;
    a second heat exchanger provided on said second piping;
    a second expansion valve provided on said second piping;
    a third heat exchanger coupled to an output of said first heat exchanger and to an output of said second heat exchanger, said third heat exchanger provided so as to receive cooling water used by said internal combustion engine;
    a third open/close valve provided in a first path parallel to a second path in which said third heat exchanger is provided;
    a heater core provided so as to receive the cooling water used by said internal combustion engine;
    a fourth open/close valve disposed in an engine water cooling path between said internal combustion engine and said third heat exchanger;

a first air flow passage that includes said first heat exchanger and said heater core, wherein said first heat exchanger is disposed in an upstream air flow position with respect to said heater core in said first air flow passage; and a second air flow passage that includes said second heat exchanger and said second condenser, wherein said second heat exchanger is disposed in an upstream air flow position with respect to said second condenser in said second air flow passage, wherein an output of said third heat exchanger is coupled to an input of said compressor, wherein said first air flow passage provides air conditioning to a first region in a passenger compartment of said motor vehicle, wherein said second air flow passage provides air conditioning to a second region in the passenger compartment of said motor vehicle, wherein, in a first mode of heating that corresponds to an initial stage of heating of the passenger compartment, said first open/close valve is closed and said second open/close valve is open, and wherein said two-way valve is operative so as to provide refrigerant through said bypass path so as to bypass said first condenser, wherein, in the first mode of heating, said compressor compresses refrigerant, so that high temperature, high pressure refrigerant is output from said compressor, and passes through said bypass path, said liquid tank, said second open/close valve, said second condenser, said second heat exchanger, and said third heat exchanger, so as to be returned back to said compressor as low temperature, low pressure refrigerant, wherein said first heat exchanger does not operate in the first mode of heating due to said first open/close valve being closed, wherein air flowing in the first air flow passage during the first mode of heating is warmed slightly by said heater core so as to provide warm air to the first region of the passenger compartment during the first mode of heating, wherein a heat exchange is carried out between said second condenser and air flowing in the second air flow passage during the first mode of heating, wherein said second heat exchanger operates as an evaporator so as to cool the air flowing in the second air flow passage during the first mode of heating, wherein the air flowing in the second air flow passage during the first mode of heating is cooled by said second heat exchanger and then warmed by said second condenser, before being provided to the second region of the passenger compartment, wherein, in a second mode of heating that corresponds to an stable stage of heating of the passenger compartment that is provided after said first mode of heating has completed, said first open/close valve is open and said second open/close valve is open, and wherein said two-way valve is operative so as to bypass said first condenser, wherein, in the second mode of heating, said second heat exchanger operates as an evaporator to cool air flowing in the first air flow passage, and wherein the air flowing in the first air flow passage is then heated by said heater core after being cooled by said second heat exchanger, to thereby provide dehumidified, warm air to the first region of the passenger compartment during the second mode of heating, wherein, in a first stage of the second mode of heating, the third open/close valve is closed, thereby providing all refrigerant passing through said first heat exchanger and said second heat exchanger through said third heat exchanger, and wherein, in a second stage of the second mode of heating, the fourth open/close valve is closed, thereby retaining the engine cooling water in said third heat exchanger, so as to provide heat for heating refrigerant passing through said third heat exchanger.

2. An air conditioning system as claimed in claim 1, wherein, in a third stage of the second mode of heating, the fourth open/close valve is opened, so as to provide a second bypass path, such that a first portion of refrigerant passing through said first and second heat exchangers flows through said second bypass path and not through said third heat exchanger, and such that a second portion of the refrigerant passing through said first and second heat exchangers flows through said third heat exchanger and not through said second bypass path.

3. A dual air conditioning system for a motor vehicle powered by an internal combustion engine, comprising:

a compressor;

a two-way valve coupled to an output of said compressor, said two-way valve having a first output port and a second output port;

a first condenser coupled to the first output port of said two-way valve;

a bypass path coupled to the second output port of said two-way valve;

a liquid tank arranged between said first condenser and a first expansion valve, wherein the bypass path provides a bypass of said first condenser so as to couple an output of said compressor to an input of said liquid tank while bypassing said first condenser;

a first piping coupled on one end to said liquid tank;

a first open/close valve provided on said first piping;

a first heat exchanger provided on said first piping;

said first expansion valve provided on said first piping;

a second piping coupled on one end to said liquid tank;

a second open/close valve provided on said second piping;

a second condenser provided on said second piping;

a second heat exchanger provided on said second piping;

a second expansion valve provided on said second piping;

a third heat exchanger coupled to an output of said first heat exchanger and to an output of said second heat exchanger, said third heat exchanger provided so as to receive cooling water used by said internal combustion engine;

a third open/close valve provided in a first path parallel to a second path in which said third heat exchanger is provided;

a heater core provided so as to receive the cooling water used by said internal combustion engine, wherein an output of said third heat exchanger is coupled to an input of said compressor, a first air flow passage that includes said first heat exchanger and said heater core, wherein said first heat exchanger is disposed in an upstream air flow position with respect to said heater core in said first air flow passage, a second air flow passage that includes said second heat exchanger and said second condenser, wherein said second heat exchanger is disposed in an upstream air flow position with respect to said second condenser in said second air flow passage, wherein said first air flow passage provides air conditioning to a first region in a passenger compartment of said motor vehicle, wherein said second air flow passage provides air conditioning to a second region in the passenger compartment of said motor vehicle, a fourth open/close valve disposed in an engine water cooling path between said internal combustion engine and said third heat exchanger; and a control unit for controlling said first, second, third and fourth open/close valves in the first mode of heating and in a second mode of heating, wherein, in a first stage of the second mode of heating, the fourth open/close valve is closed by the control unit, thereby retaining the engine cooling water in said third heat exchanger, so as to provide heat for heating refrigerant passing through said third heat exchanger, wherein, in a second stage of the second mode of heating, the fourth open/close valve is opened by the control unit, so as to provide a second bypass path, such that a first portion of refrigerant passing through said first and second heat exchangers flows through said second bypass path and not through said third heat exchanger, and such that a second portion of the refrigerant passing through said first and second heat exchangers flows through said third heat exchanger and not through said second bypass path.

* * * * *